United States Patent
Huang

(10) Patent No.: US 8,694,696 B2
(45) Date of Patent: Apr. 8, 2014

(54) DETECTION METHOD AND DETECTION DEVICE AND MULTIMEDIA DEVICE FOR HIGH-DEFINITION MULTIMEDIA INTERFACE

(75) Inventor: Wen-Tse Huang, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 44 days.

(21) Appl. No.: 12/766,931

(22) Filed: Apr. 26, 2010

(65) Prior Publication Data

US 2011/0090400 A1 Apr. 21, 2011

(30) Foreign Application Priority Data

Oct. 20, 2009 (TW) .............................. 98135399 A

(51) Int. Cl.
*H04N 5/44* (2011.01)
*G06F 3/00* (2006.01)

(52) U.S. Cl.
USPC .............................. 710/17; 710/15; 348/553

(58) Field of Classification Search
None
See application file for complete search history.

(56) References Cited

U.S. PATENT DOCUMENTS

| | | | | |
|---|---|---|---|---|
| 8,171,197 | B2 * | 5/2012 | Pohlmann | 710/109 |
| 2005/0259948 | A1 | 11/2005 | Ando | |
| 2006/0071921 | A1 * | 4/2006 | Park et al. | 345/204 |
| 2006/0089735 | A1 | 4/2006 | Atkinson | |
| 2008/0297655 | A1 * | 12/2008 | Kamida | 348/552 |
| 2009/0125642 | A1 | 5/2009 | Overby | |
| 2009/0156051 | A1 | 6/2009 | Doyle | |
| 2010/0073560 | A1 * | 3/2010 | Kitano et al. | 348/554 |
| 2010/0077442 | A1 * | 3/2010 | Suga | 725/149 |

FOREIGN PATENT DOCUMENTS

| CN | 1728243 A | 2/2006 |
|---|---|---|
| CN | 201178465 Y | 1/2009 |

OTHER PUBLICATIONS

Office action mailed on Dec. 19, 2011 for the China application No. 200910181088.0, p. 3 line 4~9, line 12~16, line 20~22 and line 33~34 as well as p. 4 line 3~7 and line 11~14.
Office action mailed on Mar. 4, 2013 for the Taiwan application No. 098135399, filing date: Oct. 20, 2009, p. 2 line 3~8, line 11~15, line 17~22 and line 24~26 and p. 3 line 1 and line 3~6.

* cited by examiner

*Primary Examiner* — Idriss N Alrobaye
*Assistant Examiner* — Richard B Franklin
(74) *Attorney, Agent, or Firm* — Winston Hsu; Scott Margo

(57) ABSTRACT

A detection method for detecting connection statuses of a plurality of HDMI ports in an HDMI-compatible multimedia device includes receiving a plurality of electric information of the plurality of HDMI ports, and determining connection conditions of the plurality of HDMI ports.

25 Claims, 18 Drawing Sheets

| Pin 1  | TMDS Data2+ |
| Pin 2  | TMDS Data2 Shield |
| Pin 3  | TMDS Data2− |
| Pin 4  | TMDS Data1+ |
| Pin 5  | TMDS Data1 Shield |
| Pin 6  | TMDS Data1− |
| Pin 7  | TMDS Data0+ |
| Pin 8  | TMDS Data0 Shield |
| Pin 9  | TMDS Data0− |
| Pin 10 | TMDS Clock+ |
| Pin 11 | TMDS Clock Shield |
| Pin 12 | TMDS Clock− |
| Pin 13 | CEC |
| Pin 14 | Reserved (N.C. on device) |
| Pin 15 | SCL |
| Pin 16 | SDA |
| Pin 17 | DDC/CEC Ground |
| Pin 18 | +5 V Power ( max 50 mA ) |
| Pin 19 | Hot Plug Detect |

| Logical address and the corresponding device ||
|---|---|
| Logical Address | Device |
| 0 | TV |
| 1 | Recording Device 1 |
| 2 | Recording Device 2 |
| 3 | Tuner 1 |
| 4 | Playback Device 1 |
| 5 | Audio system |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered/Broadcast |

FIG. 3 PRIOR ART

| Condition | HDMLP1 Rb1= 27K-ohm | HDMLP2 Rb2= 51K-ohm | HDMLP3 Rb3= 68K-ohm | HDMLP4 Rb4= 91K-ohm | V_ADC RL= 20K-ohm | 8-bit value |
|---|---|---|---|---|---|---|
| 0 | Off | Off | Off | Off | 0V | 00 |
| 1 | Off | Off | Off | On | 0.9V | 2E |
| 2 | Off | Off | On | Off | 1.136V | 3A |
| 3 | Off | Off | On | On | 1.697V | 56 |
| 4 | Off | On | Off | Off | 1.96V | 64 |
| 5 | Off | On | Off | On | 1.764V | 5A |
| 6 | Off | On | On | Off | 2.03V | 67 |
| 7 | Off | On | On | On | 2.376V | 79 |
| 8 | On | Off | Off | Off | 3.7V | BD |
| 9 | On | Off | Off | On | 2.449V | 7D |
| 10 | On | Off | On | Off | 2.54V | 82 |
| 11 | On | Off | On | On | 2.78V | 8E |
| 12 | On | On | Off | Off | 2.655V | 87 |
| 13 | On | On | Off | On | 2.874V | 93 |
| 14 | On | On | On | Off | 2.939V | 96 |
| 15 | On | On | On | On | 3.11V | 9F |

FIG. 7

| HDMI port | Connection condition | Physical address | Logical address | Device | Device status |
|---|---|---|---|---|---|
| TV | Connected | 0.0.0.0 | 0 | TV | On |
| HDMI_P1 | Connected | 1.0.0.0 | 4 | DVD player | Operating |
| HDMI_P2 | – | 2.0.0.0 | – | – | – |
| HDMI_P3 | Connected | 3.0.0.0 | 5 | Audio system | On |
| HDMI_P3 | Connected | 3.2.0.0 | 8 | Blue-ray player | On |
| HDMI_P3 | Connected | 3.5.0.0 | 11 | Game console | Off |
| HDMI_P4 | – | 4.0.0.0 | – | – | – |

US 8,694,696 B2

DETECTION METHOD AND DETECTION DEVICE AND MULTIMEDIA DEVICE FOR HIGH-DEFINITION MULTIMEDIA INTERFACE

BACKGROUND OF THE INVENTION

1. Field of the Invention

The present invention relates to a detection method and detection device and multimedia device, and more particularly, to a detection method and detection device and multimedia device capable of detecting alterations of external devices through a path other than a consumer electronic control (CEC) channel.

2. Description of the Prior Art

High-Definition Multimedia Interface (HDMI) is a full digital transmission interface for images and sounds, and can transmit uncompressed audio and video signals at the same time. HDMI-compatible devices, such as a set-top box, a compact disk (CD) player, a personal computer (PC), a television (TV) game console, a digital stereo, and a TV set, can connect to each other through HDMI-related Transition-Minimized Differential Signaling (TMDS) channels, Display Data Channels and Consumer Electronics Control (CEC) channels. Therefore, HDMI has gradually replaced a conventional analog audio/video transmission interface, such as SCART and RCA terminals.

Please refer FIG. 1, which is a schematic diagram of a conventional HDMI system 10. In the HDMI system 10, HDMI-compatible devices can be categorized into source devices, repeater devices and sink devices according to functionalities. The source devices, such as a CD player, a TV game console, a PC, and a set-top box, are only equipped with HDMI output function, for outputting HDMI signals. The repeater devices, such as a HDMI switch, are equipped with both HDMI reception and output functions, for transferring HDMI signals outputted by the source devices to the sink devices. The repeater devices can transfer signals in single-to-single mode, single-to-multiple mode, multiple-to-single mode, or multiple-to-multiple mode, and may amplify signals at the same time. The sink devices, such as a TV set, a monitor, etc., are only equipped with HDMI reception function, for processing HDMI signals. In addition, if a sink device is equipped with both HDMI reception and transmission functions, a role of the sink device is determined by whether an output of the sink device is connected to an input of another sink device. If another sink device is connected, the sink device performs in the role of a repeater device before the connection is invalid.

In general, an HDMI device is equipped with an independent control interface, such as a remote controller. Under such a condition, if a consumer owns more HDMI multimedia devices, the consumer has to operate more remote controllers, leading to great inconvenience. In this case, a multi-control scheme can be achieved by usage of CEC standard, i.e. using built-in control buttons of another HDMI device in a CEC network to control other HDMI devices on the CEC network at will.

First of all, FIG. 2 is a schematic diagram of a HDMI connector and definitions of pins thereof. As shown in FIG. 2, a pin 13 is used for transmitting a CEC signal. Via the pin 13, a user can control devices supporting HDMI-CEC. For example, the user can utilize a TV set supporting HDMI-CEC to control an external HDMI-CEC DVD player via the pin 13, to perform fast-forward or rewind, or control an HDMI-CEC set-top box to switch channels.

Five categories with twelve devices are defined and each device is assigned with a specific logical address (LA) in CEC standard. As shown in FIG. 3, LA of a TV is "0", LA of a recording device (such as a DVD recorder) is "1", "2" or "9", LA of a tuner is "3", "6", "7" or "10", LA of a playback device (such as a DVD player) is "4", "8" or "11", LA or a audio system is "5". Besides, LA "12" and "13" are reserved for other undefined devices. LA "14" is used for a TV having physical address (PA) not equal to "0000". LA "15" is unregistered or for broadcasting. The LA is related to a category of an HDMI-CEC device, while the PA is related to topology of HDMI-CEC network, i.e. an address of an HDMI device in HDMI-CEC network. For example, assume that the sink device shown in FIG. 1 is a TV, the LA of the TV is set to "0", and the PA is set to "0000".

Furthermore, according to CEC standard, an HDMI-CEC device can send a poll packet to a specific LA, so as to acquire if any device is connected to a CEC network according to whether the LA is occupied. In order to ensure a home multimedia system runs smoothly, even if there is no HDMI device connected to a CEC network, a CEC device (such as a TV set) periodically sends the poll packet as performing synchronization. Under such a condition, a period of sending the poll packets matters to system performance. The period can be either too short such that the system is unnecessarily loaded, or too long such that operating sensitivity of a user interface is affected.

Under such condition, how to enhance detection efficiency of the CEC device without adding system loading becomes an important issue.

SUMMARY OF THE INVENTION

It is therefore an object of the present invention to provide a detection method and detection device and multimedia device.

The present invention discloses a detection method for detecting connection statuses of a plurality of High-Definition Multimedia Interface (HDMI) ports in an HDMI-compatible multimedia device. The detection method includes receiving a plurality of electric information of the plurality of HDMI ports; and determining connection conditions of the plurality of HDMI ports according to the plurality of electric information.

The present invention further discloses a detection device for detecting connection statuses of a plurality of High-Definition Multimedia Interface (HDMI) ports in an HDMI-compatible multimedia device. The detection device includes a capture module, for receiving a plurality of electric information of the plurality of HDMI ports; and a logic module, for determining connection conditions of the plurality of HDMI ports according to the plurality of electric information.

The present invention further discloses a multimedia device for a High-Definition Multimedia Interface compatible (HDMI-compatible) multimedia system. The multimedia device includes a plurality of HDMI ports, a switch controller, coupled to the plurality of HDMI ports, for switching to output signals of an HDMI port of the plurality of HDMI ports, an operating module, for processing signals outputted from the switch controller, and a detection device. The detection device includes a capture module, for receiving a plurality of electric information of the plurality of HDMI ports, and a logic module, for determining connection conditions of the plurality of HDMI ports according to the plurality of electric information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of device categorization according to conventional CEC standard.

FIG. 7 is a schematic diagram of a conversion table according to an embodiment of the present invention.

DETAILED DESCRIPTION

In order to enhance detection efficiency of an HDMI-CEC device without increasing system loading, the present invention utilizes an extra detection method for determining connection condition of each HDMI port, which can report alterations of external devices in real time without increasing frequency of sending poll packets, and even get rid of the poll packets.

Figure 1:
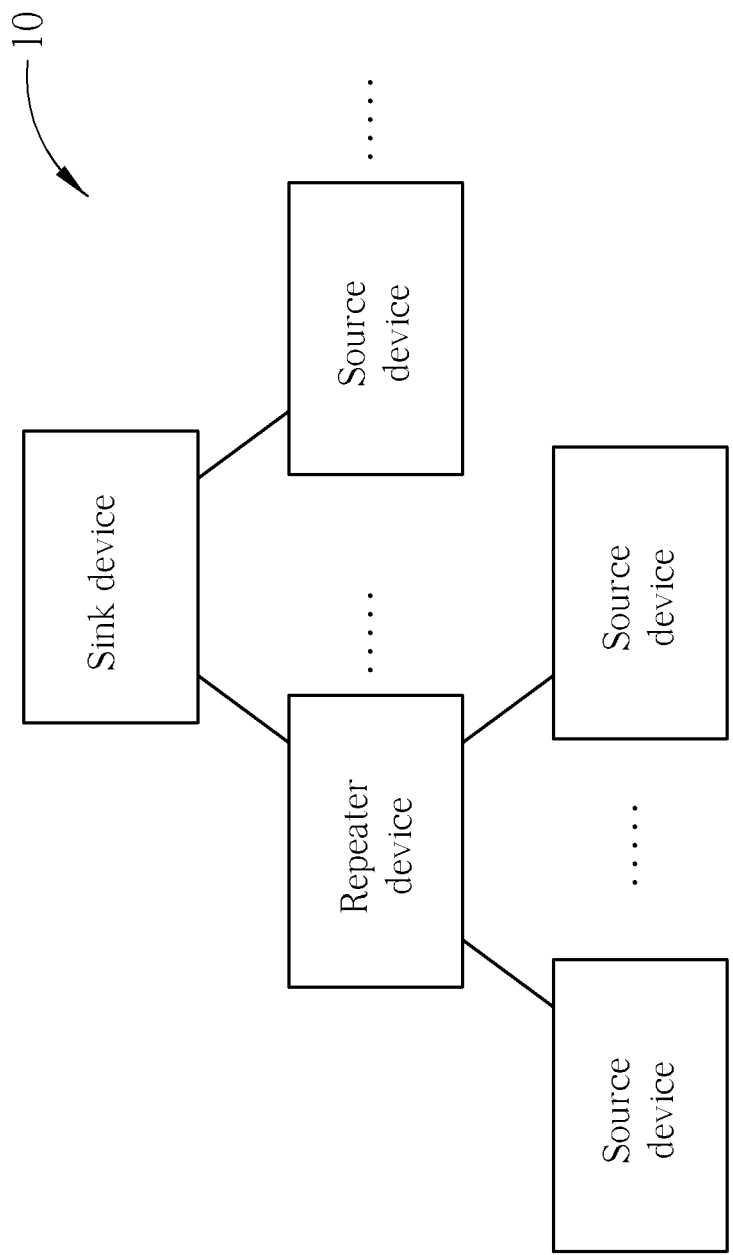
FIG. 1 is a schematic diagram of a conventional HDMI system.
Figure 2:
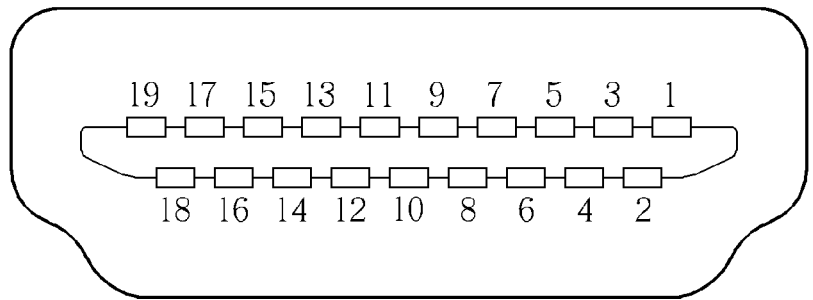
FIG. 2 is a schematic diagram of a conventional HDMI connector and definitions of pins.
Figure 4:
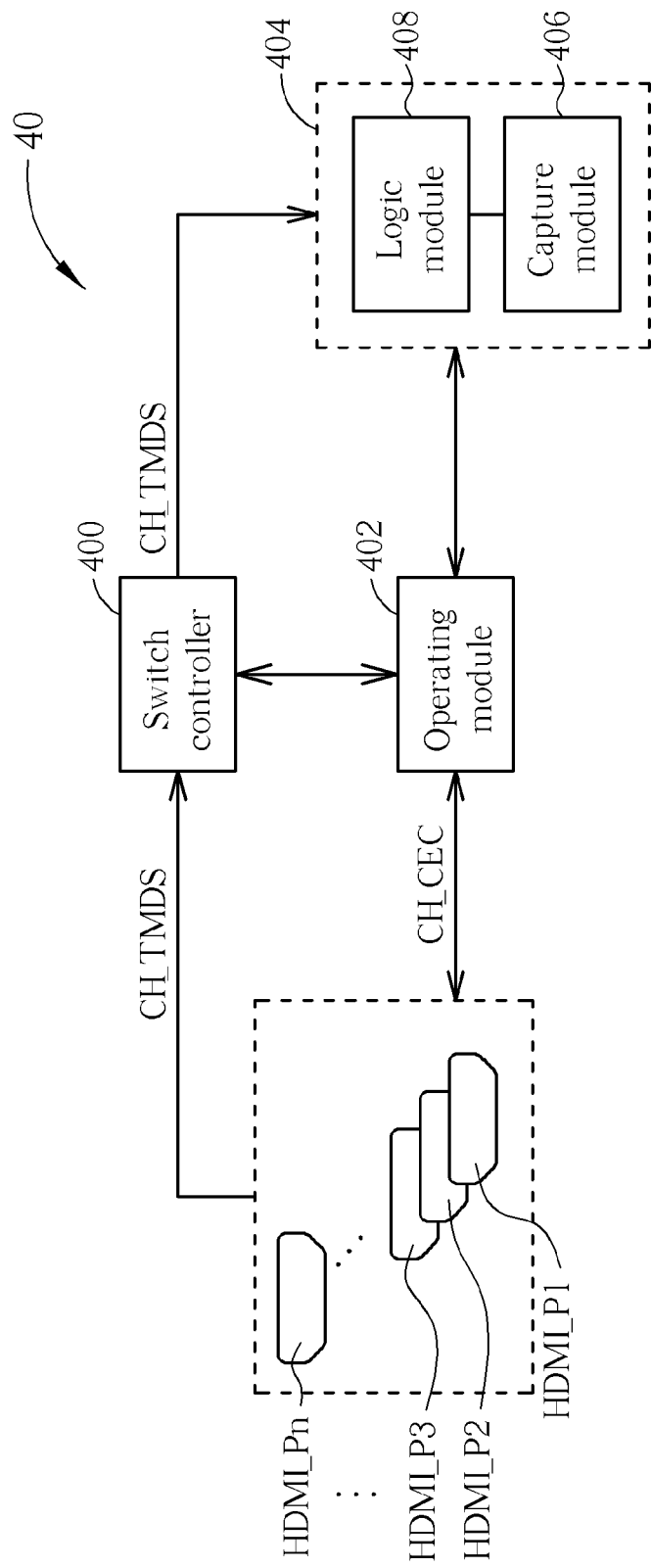
FIG. 4 is a schematic diagram of a multimedia device according to an embodiment of the present invention.

Please refer to FIG. 4, which is a schematic diagram of a multimedia device 40 according to an embodiment of the present invention. The multimedia device 40 is preferably an HDMI-CEC-compatible TV set or monitor, and includes HDMI ports HDMI_P1~HDMI_Pn, a switch controller 400, an operating module 402 and a detection device 404. The HDMI ports HDMI_P1~HDMI_Pn can be connected with other HDMI devices. The switch controller 400 selects to output signals of an HDMI port of the HDMI ports HDMI_P1~HDMI_Pn to the operating module 402 according to user control, so as to generate corresponding multimedia effect. The operating module 402 may include hardware or software, such as a processor, a power management device, a periphery state detection circuit, a storage device, an output device, for realizing functions of the multimedia device 40. The structure of the multimedia device 40 can be modified according to different system. Besides, the switch controller 400 processes signals of a Transition-Minimized Differential Signaling (TMDS) channel CH_TMDS, and the operating module 402 can exchange control signals or send the poll packets to each external HDMI-CEC device through a Consumer Electronics Control (CEC) channel CH_CEC. In addition, the detection device 404 includes a capture module 406 and a logic module 408, for detecting connection conditions of the HDMI ports HDMI_P1~HDMI_Pn through a path other than the CEC channel (CH_CEC), and transmitting detection results to the operating module 402, so as to timely update the connection statuses of the external HDMI devices.

In detail, the capture module 406 is utilized for receiving electric information of the HDMI ports HDMI_P1~HDMI_Pn, such as voltage, current, voltage difference, current difference of each HDMI port, while the logic module 408 is utilized for determining the connection conditions of the HDMI ports HDMI_P1~HDMI_Pn according to the electric information received by the capture module 406. In other words, the multimedia device 40 does not need to actively send the poll packets to acquire the connection statuses of the external HDMI devices. In such a situation, the frequency of sending the poll packets can be effectively reduced, for reducing system loading. More importantly, the multimedia device 40 can immediately respond to insertion or removal of the external HDMI devices, e.g. display a message on the TV screen to indicate insertion or removal of an external device corresponding to an HDMI port, or update contents of On-Screen Display (OSD).

Furthermore, the multimedia device 40 can utilize the detection result of the detection device 404 to reduce or stop sending the poll packets, which certainly conforms to operation mode of CEC standard, for enhancing compatibility. In this case, the multimedia device 40 could have the following three detection methods for detecting the external HDMI-CEC devices:

First, software detection mode: the multimedia device 40 actively sends the poll packets, so as to detect the connection statuses of the external HDMI-CEC devices, which is identical with the typical system.

Second, hardware detection mode: the multimedia device 40 does not actively send the poll packets, but utilizes the detection result of the detection device 404 instead. The multimedia device 40 performs handshaking procedure only when an external HDMI-CEC device is inserted or removed, so as to receive necessary status information.

Third, hybrid detection mode: the multimedia device 40 combines the aforementioned two detection modes. After the detection device 404 detects insertion or removal of an external HDMI-CEC device, the multimedia device 40 continues to send polling messages to the external HDMI-CEC device periodically.

Therefore, using the detection device 404, the multimedia device 40 can choose the hardware detection mode or the hybrid detection mode to dynamically and timely detect the connection statuses of the external HDMI-CEC devices, so as to improve disadvantages in the prior art. Noticeably, the capture module 406 and the logic module 408 of the detection device 404 shown in FIG. 4 are utilized for realizing corresponding operations. In practical, those skilled in the art can either design structure by use of software or hardware according to practical requirement, or can achieve the objective of the present invention by use of circuits or elements already in the multimedia device 40 according to the above concept.

Figure 5:
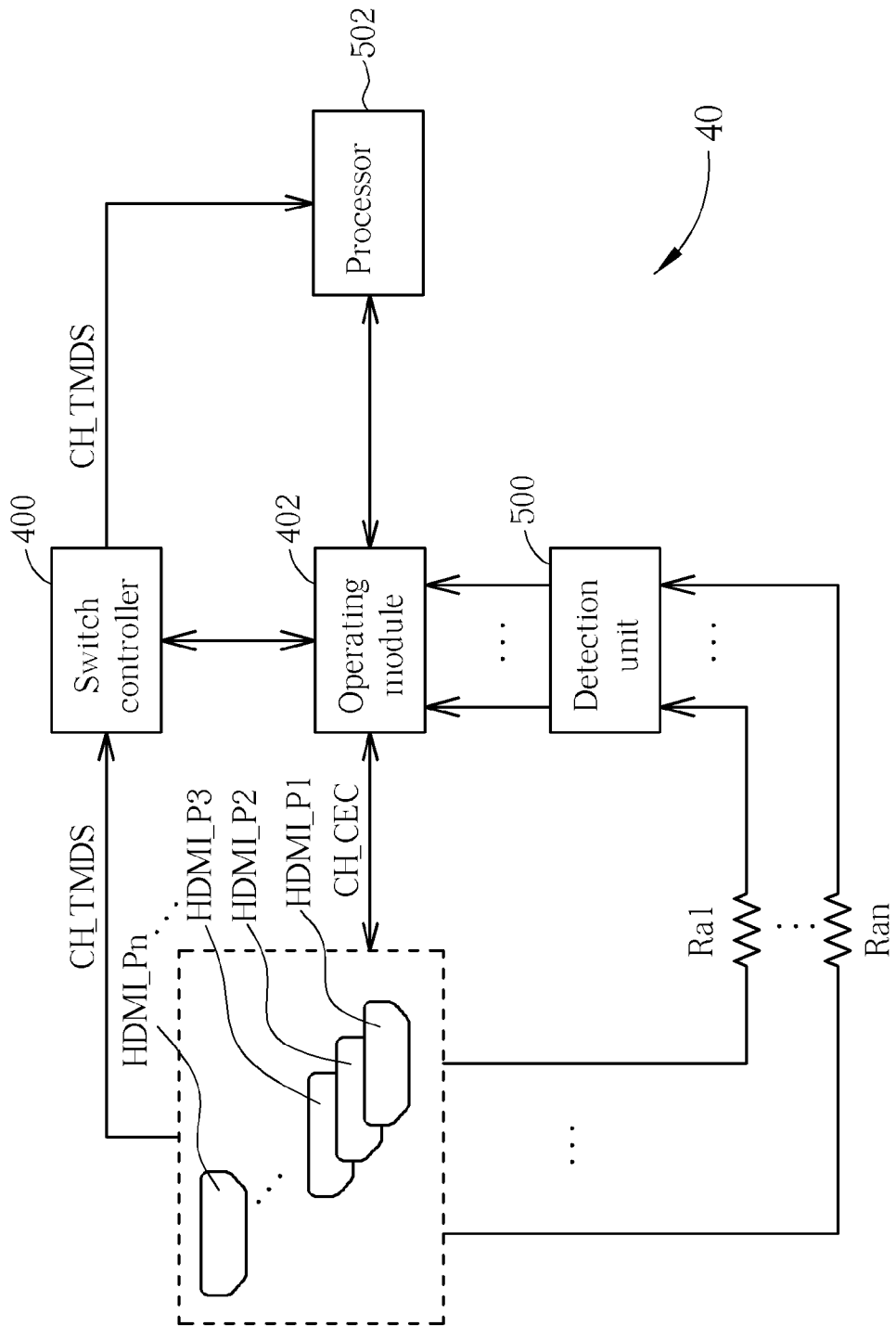
FIG. 5 is a schematic diagram of alteration of the multimedia device shown in FIG. 4.

For example, in FIG. 5, a detection unit 500 and resistors Ra1~Ran are utilized for realizing the capture module 406, and a processor 502 is utilized for realizing the logic module 408. The resistors Ra1~Ran can be seen as electric signal generation units, for generating corresponding analog electric signals according to the connection conditions of the HDMI ports HDMI_P1~HDMI_Pn, and the power source (such as 5V) can be provided by external devices. The detection unit 500 can be a detector of General Purpose Input/Output (GPIO) pin in the operating module 402, and can periodically detect the analog electric signals transmitted by the resistors Ra1~Ran according to system setting (e.g. controlled by the processor 502), to determine the electric information of the HDMI ports HDMI_P1~HDMI_Pn.

By utilizing the GPIO pin to detect the analog electric signals of the HDMI ports HDMI_P1~HDMI_Pn, the detection unit 500 needs to detect the electric signals of the resistors Rat-Ran periodically (e.g. every 0.1 ms). Besides, interrupt (IRQ) pin can be used for detection as well. By utilizing the IRQ pin, the processor 502 only needs to detect alterations of the HDMI ports HDMI_P1~HDMI_Pn when interruption occurs instead of periodically detecting, so as to save system resource.

Figure 6:
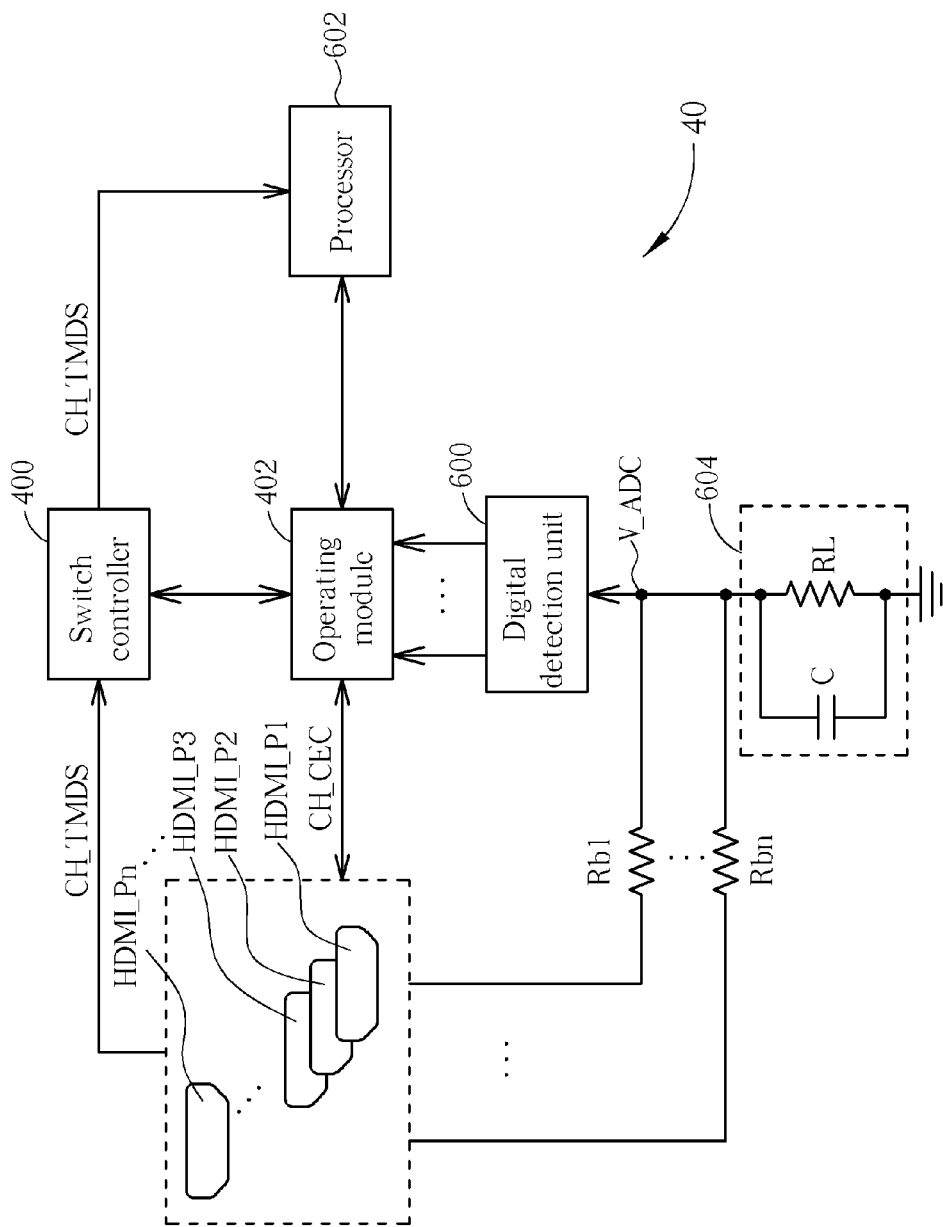
FIG. 6 is a schematic diagram of another alteration of the multimedia device shown in FIG. 4.

Furthermore, an analog-to-digital converter of the operating module 402 can be utilized, for realizing the capture module 406. For example, in FIG. 6, a digital detection unit 600, resistors Rb1~Rbn and an analog-to-digital conversion unit 604 are utilized for realizing the capture module 406, and the processor 602 is utilized for realizing the logic module 408. By comparing FIG. 6 and FIG. 5, electric signals of the resistors Rb1~Rbn shown in FIG. 6 are converted into a voltage signal V_ADC corresponding to a digital value by the analog-to-digital conversion unit 604. Therefore, the digital detection unit 600 can be seen as a microcontroller of the operating module 402. As a result, as long as values of resistors Rb1~Rbn and values of a resistor RL and a conductor C of the analog-to-digital conversion unit 604 are properly set, connection statuses of the HDMI ports HDMI_P1~HDMI_Pn can be correctly determined via default firmware or program code. For example, assume the number of the HDMI ports HDMI_P1~HDMI_Pn are 4 (n=4), the resistors Rb1~Rb4 are respectively 27 KΩ, 51 KΩ, 68 KΩ, 91 KΩ, the resistor RL is 20 KΩ, and the conductor C is 20 pF. Under such a condition, assume that power provided by the external devices is 5V, and a conversion table shown in FIG. 7 can be derived. The conversion table illustrates 16 connection conditions of the HDMI ports HDMI_P1~HDMI_P4, and corresponding voltage signal V_ADC and 8-bit digital value. Accordingly, the digital detection unit 600 can periodically detect the voltage signal V_ADC to generate the corresponding digital value, so as to determine the connection conditions of the HDMI ports HDMI_P1~HDMI_P4, such that the multimedia device 40 can timely respond to the insertion or removal of the external HDMI devices.

In addition, in the multimedia device 40, the switch controller 400 usually includes a buffer, for storing the connection conditions of the HDMI ports HDMI_P1~HDMI_Pn. Therefore, the capture module 406 can also be realized by utilizing a reading unit to periodically read data stored in the buffer of the switch controller 400, so as to provide the logic module 408 the data for determining operating conditions of the HDMI ports HDMI_P1~HDMI_Pn.

As can be seen from the above, the present invention can provide flexible detection modes via the detection method beyond CEC standard, and can effectively enhance detection efficiency and resource utility as well. Furthermore, after the connection conditions of the HDMI ports HDMI_P1~HDMI_Pn are detected, the multimedia device 40 can perform responding procedure, such as outputting an alteration message of the HDMI ports HDMI_P1~HDMI_Pn. Noticeably, operations of the multimedia device 40 according to the detection result of the detection device 404 should be based on different system requirements, and functions or elements shall be properly added or those already in the operating module 402 shall be properly utilized, for achieving specific requirements. For example, an indication message generation unit can be added or that already in the operating module 402 can be utilized, for generating indication messages. Then, an output unit generates corresponding signals, e.g. texts, images, sounds, flashes etc., or a storage unit stores the indication messages. More specifically, assume that the multimedia device 40 is a TV set, if the connection status of an HDMI port of the HDMI ports HDMI_P1~HDMI_Pn is changed, the screen can display the alteration of the HDMI port, or the connection conditions are stored in a memory and not displayed until user requests OSD. However, the major concept is established upon the detection device 404 has received the connection status of the HDMI ports HDMI_P1~HDMI_Pn, no matter what subsequent operations are. Therefore, designers should adjust subsequent operations and system structures according to practical requirement.

Figure 8:
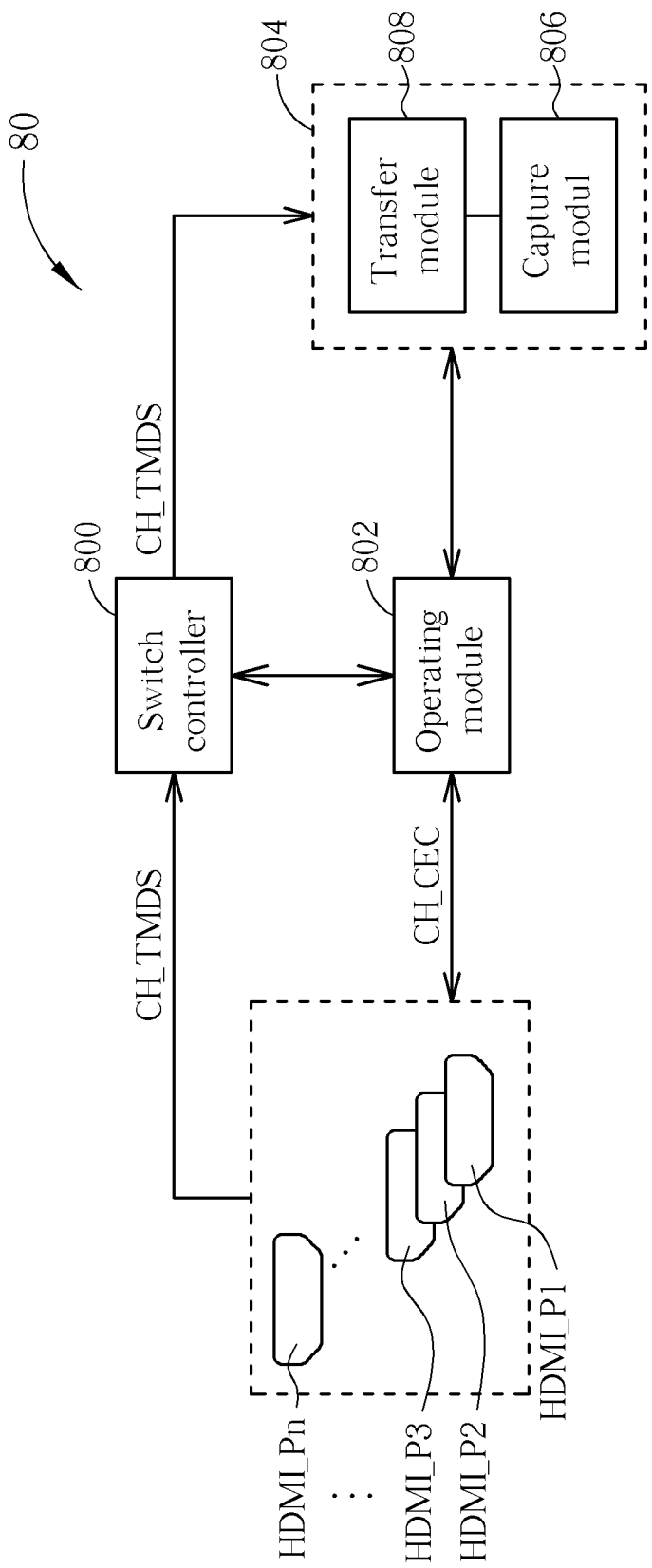
FIG. 8 is a schematic diagram of an HDMI repeater device according to an embodiment of the present invention.
Figure 9A:
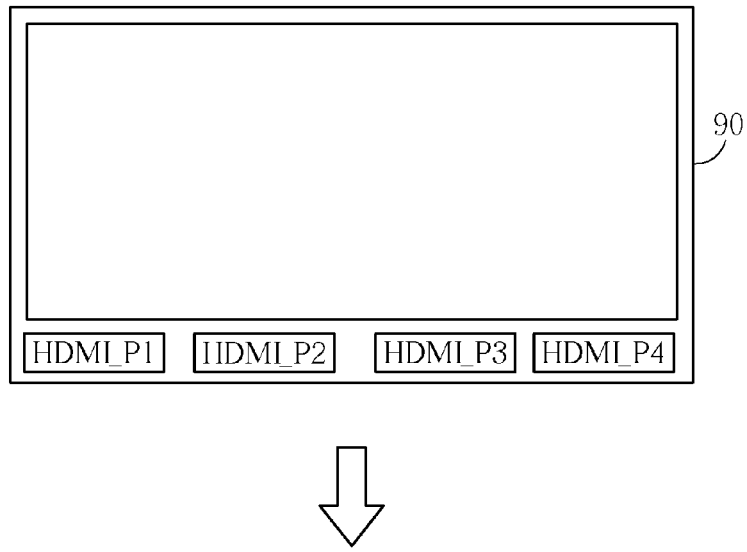
FIG. 9A to FIG. 9E illustrate different operation conditions of an HDMI TV according to an embodiment of the present invention.
Figure 9B:
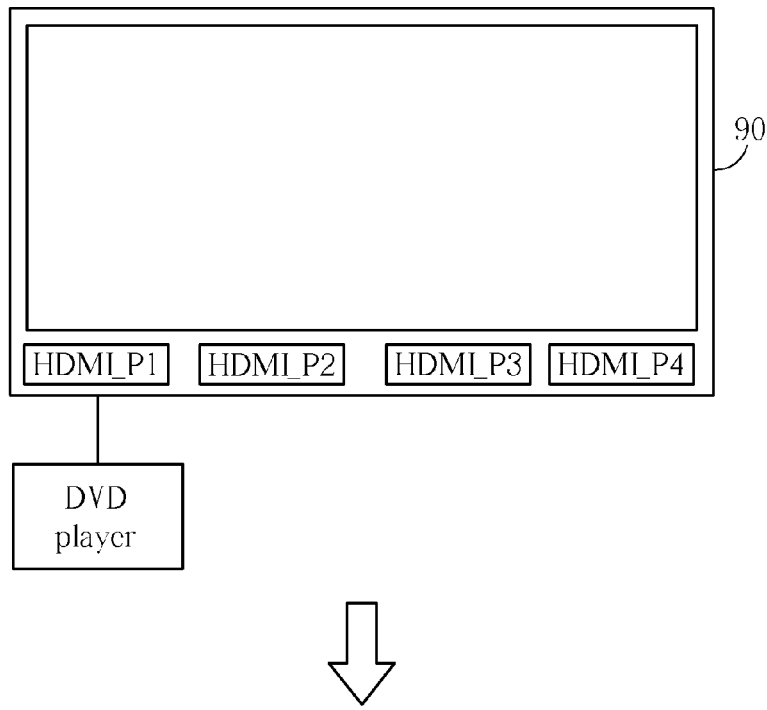
Figure 9C:
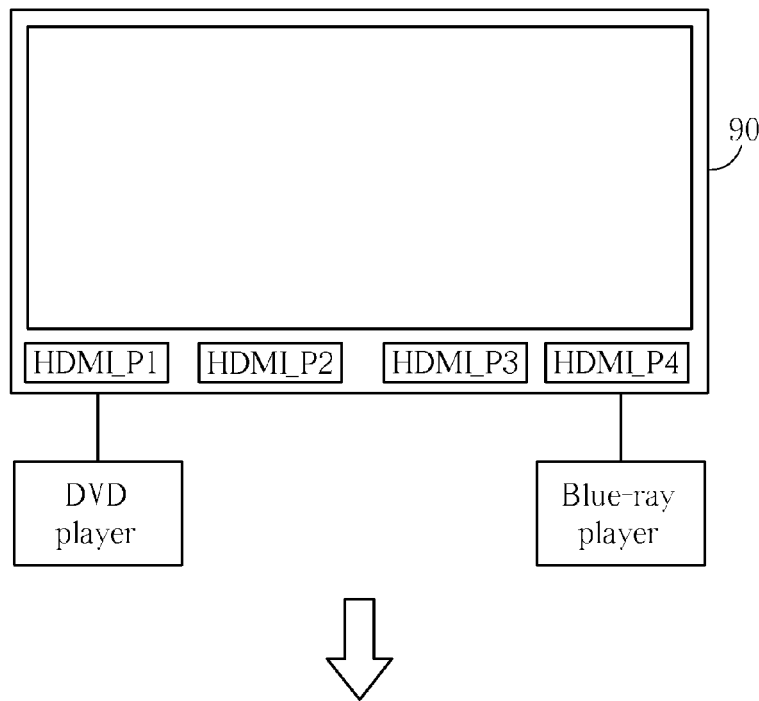
Figure 9D:
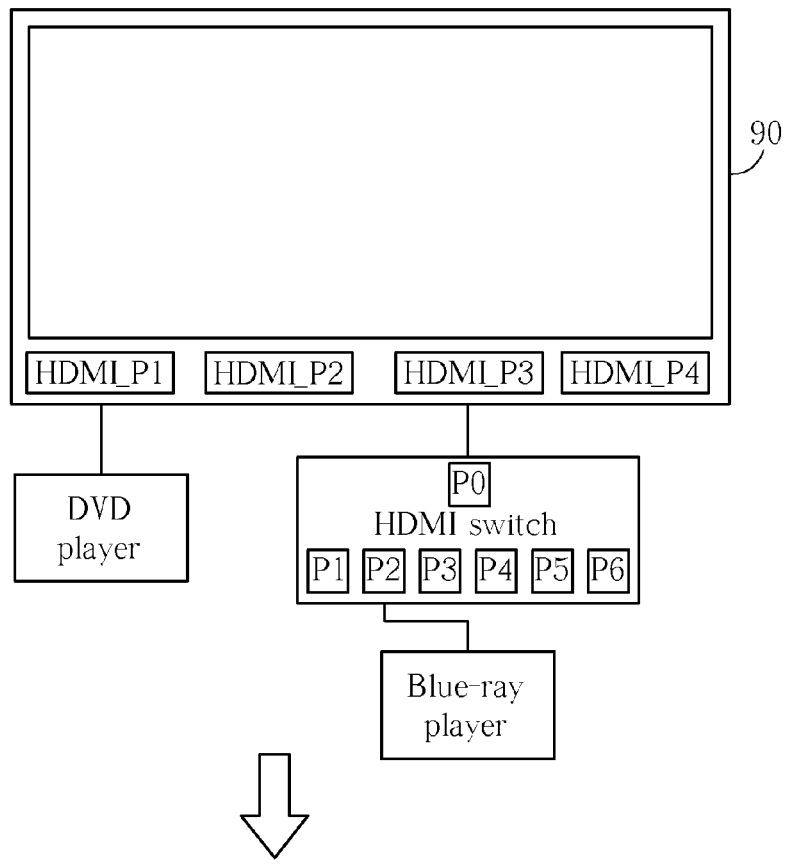
Figure 9E:
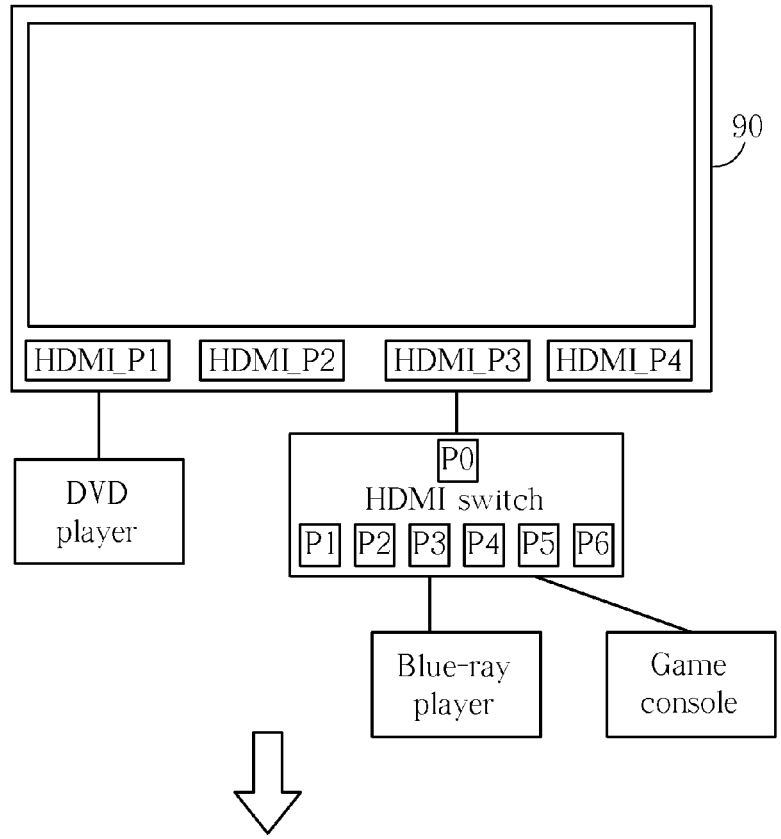

On the other hand, all the above embodiments take sink devices such as TV or monitor for example. In practical, since an HDMI system can further include a repeater device, the concepts of the present invention can be applied to repeater devices as well. Please refer to FIG. 8, which is a schematic diagram of an HDMI repeater device 80 according to an embodiment of the present invention. The HDMI repeater device 80 can be an HDMI-compatible signal switch in single-to-single mode, single-to-multiple mode, multiple-to-single mode, or multiple-to-multiple mode with signal amplification function. The HDMI repeater device 80 includes HDMI ports HDMI_P1~HDMI_Pn, a switch controller 800, an operating module 802 and a detection device 804. The structure of the HDMI repeater device 80 is similar to that of the multimedia device 40 shown in FIG. 4, but function of the detection device 804 is not identical to that of the detection device 404. The detection device 804 includes a capture module 806 and a transfer module 808. The operation of the capture module 806 is identical to that of the capture module 406, i.e. for receiving the electric information of the HDMI ports HDMI_P1~HDMI_Pn such as voltage, current, voltage difference, current difference of each HDMI port. The transfer module 808 transfers the electric information received by the capture module 806 to a sink device (or other repeater devices). In other words, the HDMI repeater device 80 does not determine the connection conditions of the HDMI ports HDMI_P1~HDMI_Pn according to the electric information of the HDMI ports HDMI_P1~HDMI_Pn, but simply transfers the received information to a sink device (e.g. the multimedia device 40), and lets the sink device determine the connection condition of each HDMI source device accordingly.

Therefore, the sink device in the HDMI-compatible multimedia system can not only correctly determine alteration of the directly connected source device, but also determine alteration of the source device connected through the repeater device according to the present invention. As a result, the user can correctly determine the connection conditions of the external devices, so as to enhance convenience. For example, FIG. 9A to FIG. 9E illustrate different operation conditions of an HDMI-CEC TV 90 respectively. Assume that the HDMI-CEC TV 90 includes four HDMI ports HDMI_P1, HDMI_P2, HDMI_P3 and HDMI_P4, and the HDMI-CEC TV 90 is designed according to the concept of the present invention, such that the HDMI-CEC TV 90 can utilize hardware detection mode or hybrid detection mode, to dynamically detect the connection statuses of the external HDMI devices instantly. First, when no external device is connected, a connection condition table can be illustrated by a lower half part of FIG. 9A. Then, after the HDMI port HDMI_P1 is connected with an OFF (turned off) DVD player, the HDMI-CEC TV 90 can immediately detect alteration of the connection status of the HDMI ports HDMI_P1, and update the connection condition table as shown in a lower half part of FIG. 9B. Next, if the HDMI port HDMI_P4 is connected with an OFF blue-ray player, and the DVD player connected to the HDMI port HDMI_P1 starts running, the HDMI-CEC TV 90 can immediately update the connection condition table as shown in a lower half part of FIG. 9C. On the other hand, following FIG. 9B, if the HDMI port HDMI_P3 is connected with a six-to-one HDMI switch (having six input ports P1-P6, and an output port P0) designed according to the present invention (e.g. FIG. 8), and the input port P2 of the switch is connected to an ON (turned on) blue-ray player, then the HDMI-CEC TV 90 can immediately update the connection condition table as shown in a lower half part of FIG. 9D. Following FIG. 9D, if the input port P5 of the switch is connected to an OFF TV game console, the HDMI-CEC TV 90 can immediately update the connection condition table as shown in a lower half part of FIG. 9E.

Therefore, via the detection method of the present invention, when the connection statuses of the HDMI ports HDMI_P1~HDMI_P4 or input ports of the switch alter, the HDMI-CEC TV 90 can immediately respond and update the connection condition table accordingly. Furthermore, after the HDMI-CEC TV 90 updates the connection condition table, the HDMI-CEC TV 90 can further display update contents, or store and display connection conditions if the user requests.

In the prior art, an HDMI-CEC sink device periodically sends poll packets, or passively performs a manual update when the user adds or removes one or multiple HDMI-CEC devices. Take periodically sending poll packets for example, the period of sending the poll packets can be either too short such that the system is unnecessarily loaded, or too long such that operating sensitivity of the user interface is affected. Manual updating adds less system loading but lacks convenience. In comparison, the present invention detects the alterations of the external devices through a path other than the CEC channel. Doing so can not only respond to the alterations instantly, but also reduce the frequency of sending the poll packets as well as system loading, to enhance resource utilization rate. Besides, using the detection method of the present invention, the sink device can provide detection modes with flexibility, and effectively enhance convenience.

Figure 10A:
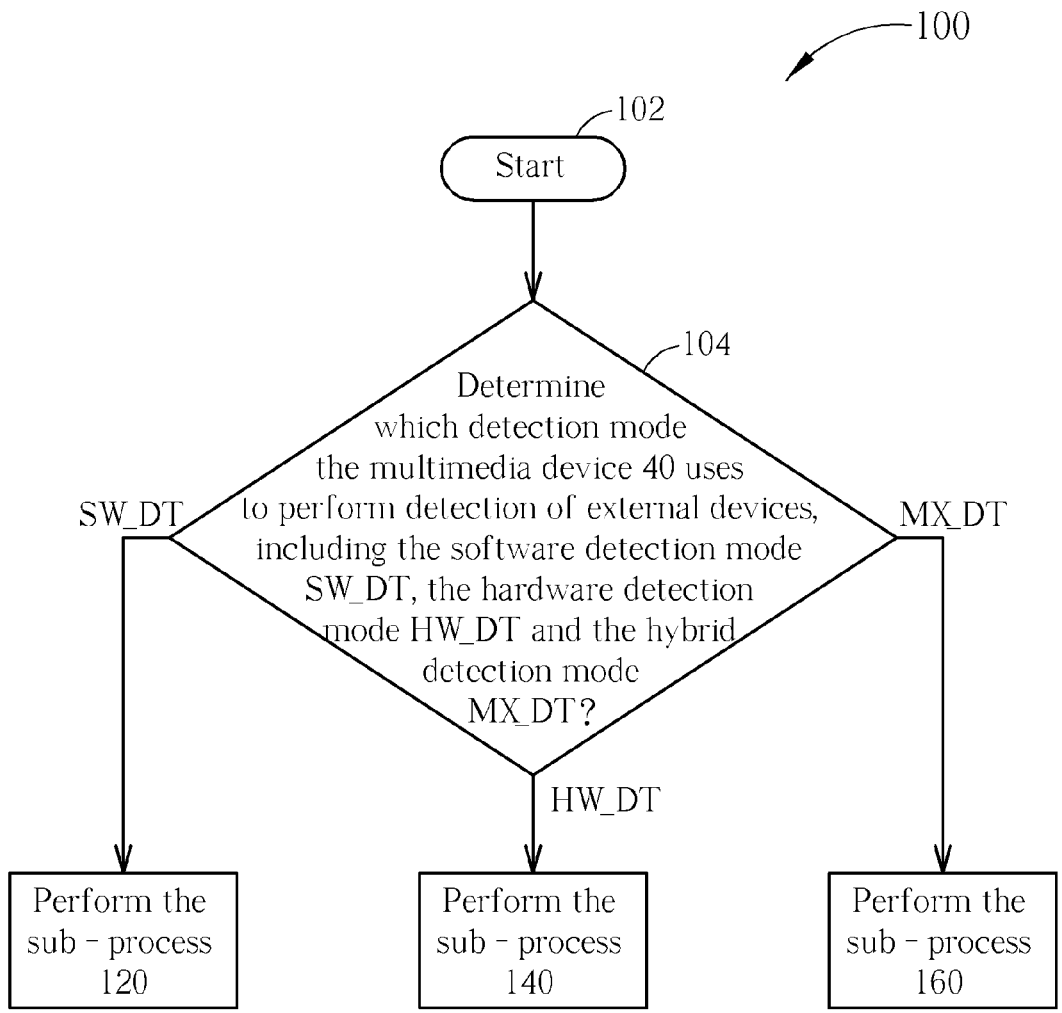
FIG. 10A to FIG. 10D are flow charts of the detection operation of the multimedia device shown in FIG. 4.

Furthermore, detection operations of the multimedia device 40 can be summarized into a process 100 and sub-processes 120,140 and 160 as shown in FIG. 10A, FIG. 10B, FIG. 10C and FIG. 10D. As shown in FIG. 10A, the process 100 includes the following steps:

Step 102: Start.

Step 104: Determine which detection mode the multimedia device 40 uses to perform detection of external devices, including the software detection mode SW_DT, the hardware detection mode HW_DT and the hybrid detection mode MX_DT. If the multimedia device 40 operates in the software detection mode SW_DT to perform the detection, perform the sub-process 120; if the multimedia device 40 operates in the hardware detection mode HW_DT to perform the detection, perform the sub-process 140; if the multimedia device 40 operates in the hybrid detection mode MX_DT to perform the detection, perform the sub-process 160.

Figure 10B:
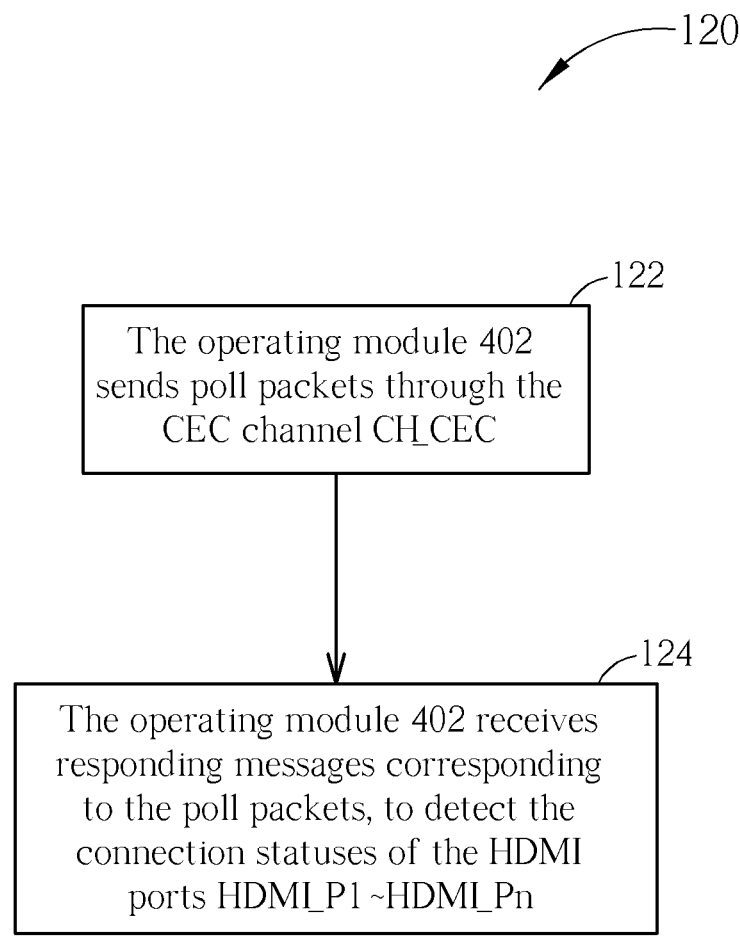

As shown in FIG. 10B, the sub-process 120 includes the following steps:

Step 122: The operating module 402 sends poll packets through the CEC channel CH_CEC.

Step 124: The operating module 402 receives responding messages corresponding to the poll packets, to detect the connection statuses of the HDMI ports HDMI_P1~HDMI_Pn.

Figure 10C:
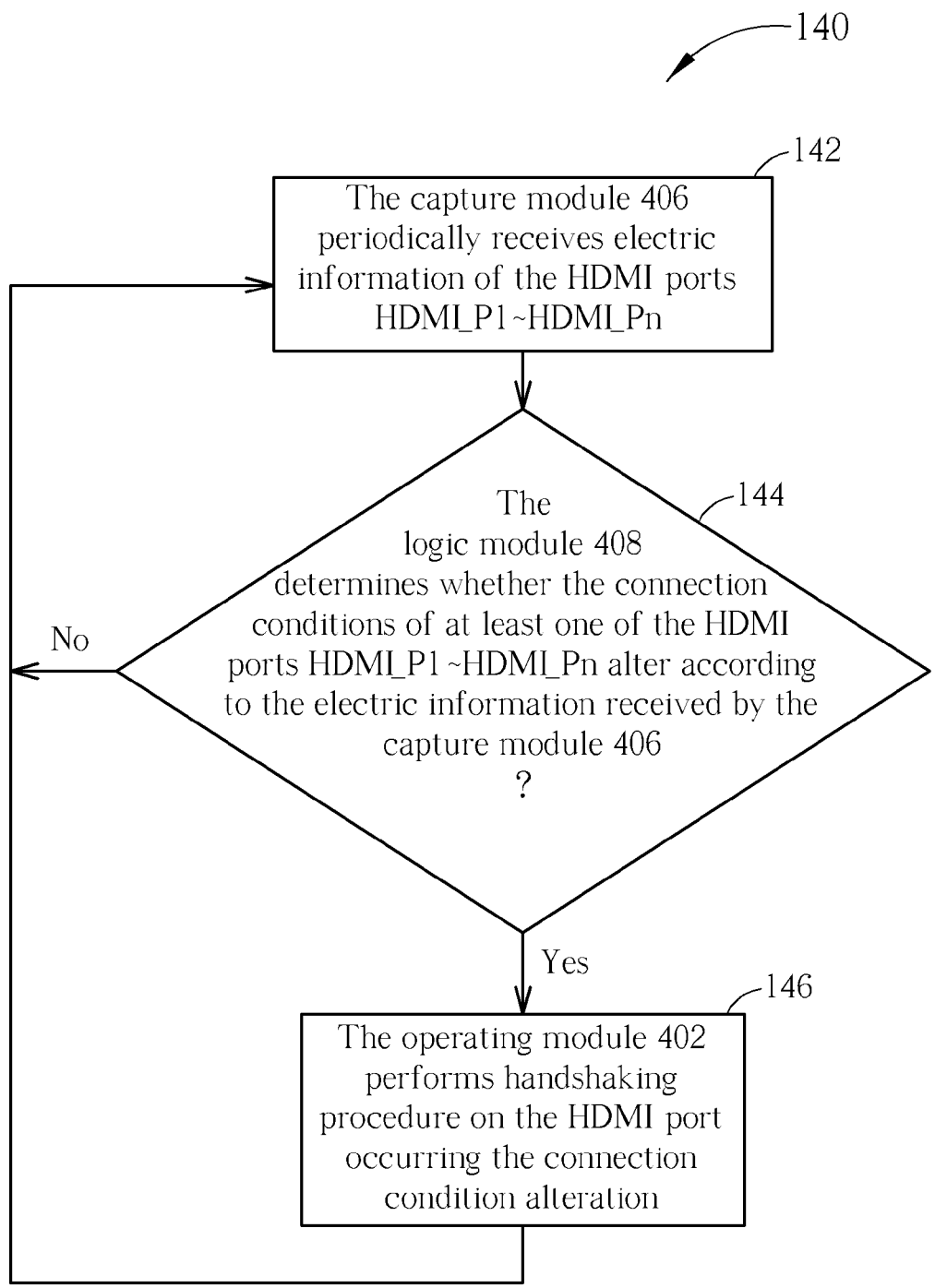

As shown in FIG. 10C, the sub-process 140 includes the following steps:

Step 142: The capture module 406 periodically receives electric information of the HDMI ports HDMI_P1~HDMI_Pn.

Step 144: The logic module 408 determines whether the connection conditions of at least one of the HDMI ports HDMI_P1~HDMI_Pn alter according to the electric information received by the capture module 406. If yes, perform step 146; otherwise, go to step 142.

Step 146: The operating module 402 performs handshaking procedure on the HDMI port occurring the connection condition alteration.

Figure 10D:
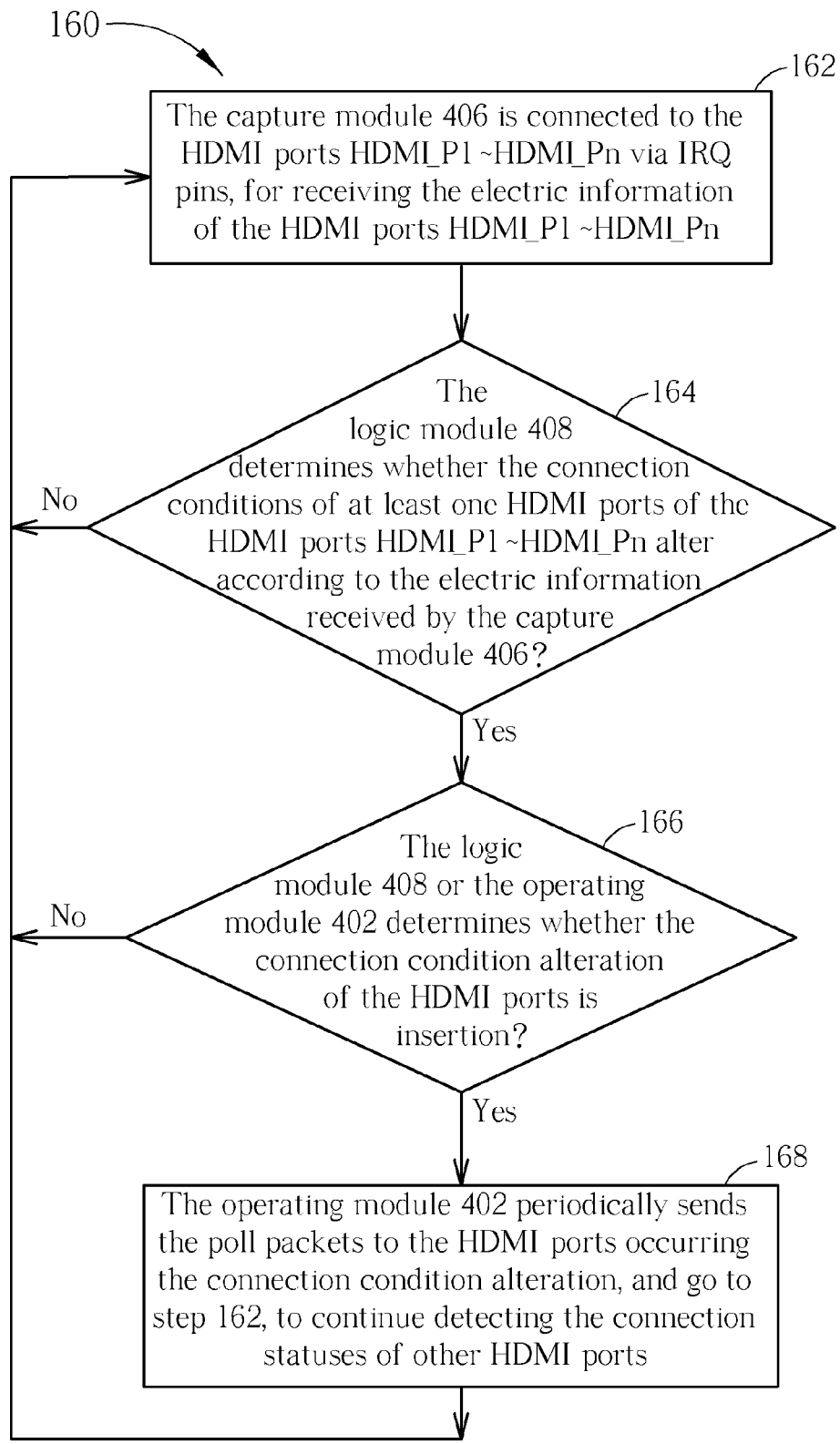
Figure 11:
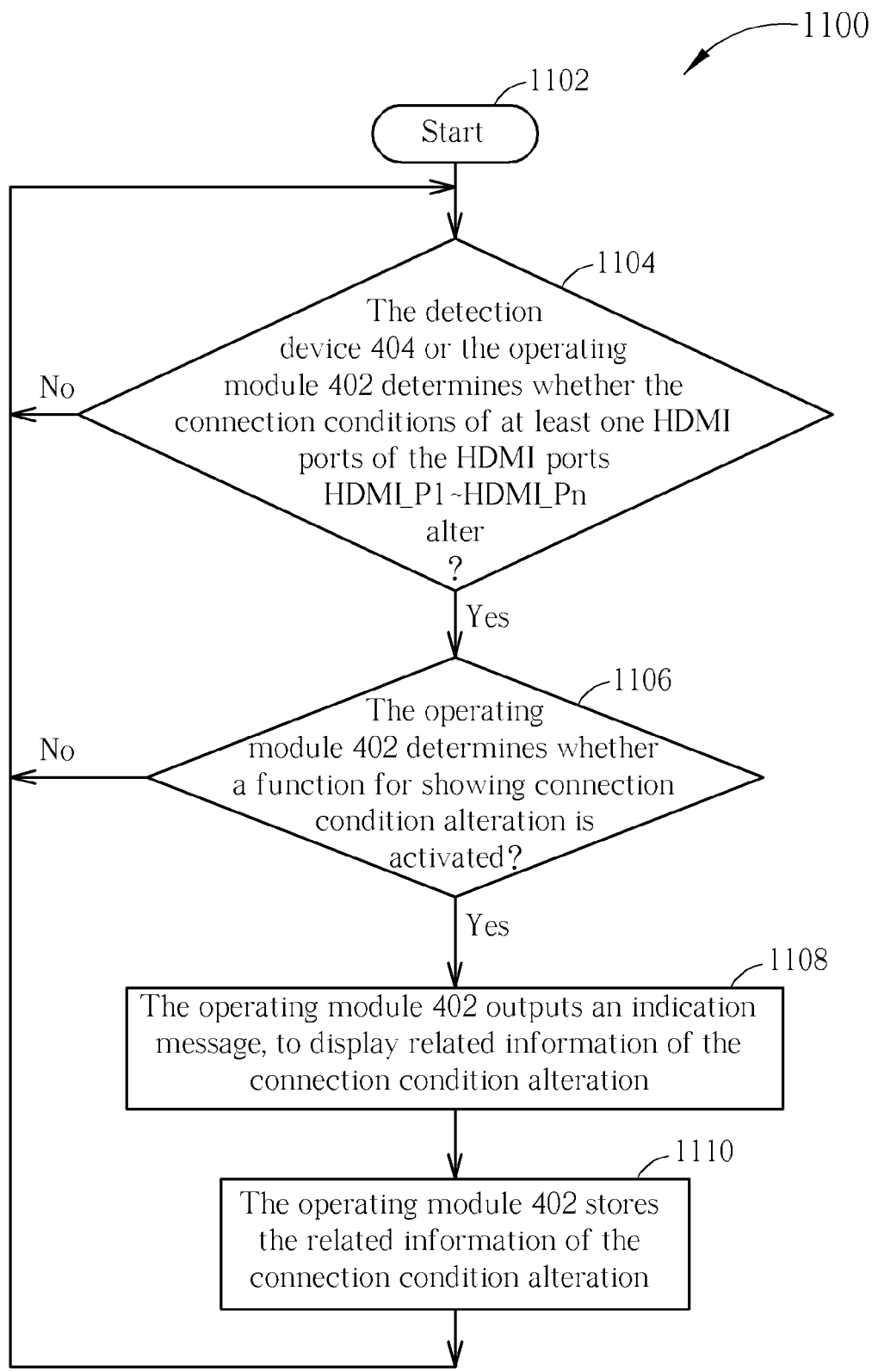
FIG. 11 is a flow chart of the detection operation of the multimedia device shown in FIG. 4.

As shown in FIG. 10D, the sub-process 160 includes the following steps:

Step 162: The capture module 406 is connected to the HDMI ports HDMI_P1~HDMI_Pn via IRQ pins, for receiving the electric information of the HDMI ports HDMI_P1~HDMI_Pn.

Step 164: The logic module 408 determines whether the connection conditions of at least one HDMI ports of the HDMI ports HDMI_P1~HDMI_Pn alter according to the electric information received by the capture module 406. If yes, perform step 166, otherwise, go to step 162.

Step 166: The logic module 408 or the operating module 402 determines whether the connection condition alteration of the HDMI ports is insertion. If yes, perform step 168; otherwise, perform step 162.

Step 168: The operating module 402 periodically sends the poll packets to the HDMI ports occurring the connection condition alteration, and go to step 162, to continue detecting the connection statuses of other HDMI ports.

FIG. 10A to FIG. 10D illustrate the multimedia device 40 receives the detection result in different modes, and detailed description can be referred from the above. In addition, operations after the multimedia device 40 receives the detection result can be summarized into a process 1100, which includes the following steps:

Step 1102: Start.

Step 1104: The detection device 404 or the operating module 402 determines whether the connection conditions of at least one HDMI ports of the HDMI ports HDMI_P1~HDMI_Pn alter. If yes, perform step 1106; otherwise, go to step 1104.

Step 1106: The operating module 402 determines whether a function for showing connection condition alteration is activated. If yes, perform step 1108; otherwise, go to step 1110.

Step 1108: The operating module 402 outputs an indication message, to display related information of the connection condition alteration.

Step 1110: The operating module 402 stores the related information of the connection condition alteration.

According to the process 1100, when the detection device 404 or the operating module 402 detects that a connection condition of a HDMI port changes, if OSD is displayed or the multimedia device 40 is set to automatically display the related information of the connection condition alteration, then the related information of the connection condition alteration is shown, otherwise the related information of the connection condition alteration is stored.

To sum up, the present invention detects the alterations of the external devices through a path other than the CEC channel. Doing so can respond to the alterations instantly, reduce the frequency of sending poll packets and system loading, provide more flexible detection modes and enhance convenience.

Those skilled in the art will readily observe that numerous modifications and alterations of the device and method may be made while retaining the teachings of the invention.

What is claimed is:

1. A detection method, for detecting connection statuses of a plurality of High-Definition Multimedia Interface (HDMI) ports in an HDMI-compatible multimedia device, comprising:
   reading a buffer of a switch controller of the plurality of HDMI ports, to receive a plurality of electric information of the plurality of HDMI ports; and
   determining connection conditions of the plurality of HDMI ports according to the plurality of electric information, wherein each of the connection conditions of the plurality of HDMI ports indicates whether an external HDMI device is attached to a corresponding HDMI port of the plurality of HDMI ports; and
   transmitting detection results of the connection conditions of the plurality of HDMI ports to an operating module;
   wherein the operating module further derives the connection conditions of the plurality of HDMI ports by sending poll packets through a Consumer Electronics Control (CEC) channel, and comprises a processor, a power management device, a periphery state detection circuit, a storage device, an output device, for realizing functions of the HDMI-compatible multimedia device.

2. The detection method of claim 1, wherein the step of reading a buffer of a switch controller of the plurality of HDMI ports, to receive the plurality of electric information of the plurality of HDMI ports comprises:
   receiving a plurality of analog electric signals of the plurality of HDMI ports; and
   converting the plurality of analog electric signals into a plurality of digital electric signals, to periodically receive the plurality of electric information according to a default period.

3. The detection method of claim 1, wherein the step of reading a buffer of a switch controller of the plurality of HDMI ports, to receive the plurality of electric information of the plurality of HDMI ports is receiving the plurality of electric information transmitted by the plurality of HDMI ports when the connection statuses of the plurality of HDMI ports are changed.

4. The detection method of claim 1, wherein the multimedia device is a sink device and the sink device is a video display device.

5. The detection method of claim 1 further comprising generating an indication message according to the connection conditions of the plurality of HDMI ports.

6. The detection method of claim 5 further comprising outputting and storing the indication message.

7. The detection method of claim 1 further comprising:
   receiving a plurality of electric information of a plurality of ports of a repeater device through an HDMI port of the plurality of HDMI ports; and
   determining connection conditions of the plurality of ports according to the plurality of electric information of the plurality of ports.

8. A detection device, for detecting connection statuses of a plurality of High-Definition Multimedia Interface (HDMI) ports in an HDMI-compatible multimedia device, comprising:
   a capture module, for reading a buffer of a switch controller of the plurality of HDMI ports, to receive a plurality of electric information of the plurality of HDMI ports; and
   a logic module, for determining connection conditions of the plurality of HDMI ports according to the plurality of electric information, wherein each of the connection conditions of the plurality of HDMI ports indicates whether an external HDMI device is attached to a corresponding HDMI port of the plurality of HDMI ports;
   wherein the detection device transmits detection results of the connection conditions of the plurality of HDMI ports to an operating module, and the operating module further derives the connection conditions of the plurality of HDMI ports by sending poll packets through a Consumer Electronics Control (CEC) channel and comprises a processor, a power management device, a periphery state detection circuit, a storage device, an output device, for realizing functions of the HDMI-compatible multimedia device.

9. The detection device of claim 8, wherein the capture module comprises:
   a plurality of electric signal generation units, coupled to the plurality of HDMI ports, for generating a plurality of analog electric signals of the plurality of HDMI ports; and
   a detection unit, for detecting the plurality of analog electric signals, to periodically receive the plurality of electric information according to a default period.

10. The detection device of claim 9, wherein an electric signal generation unit of the plurality of electric signal generation units is a resistor.

11. The detection device of claim 9 further comprising an analog-to-digital conversion unit, for converting the plurality of analog electric signals into a plurality of digital signals.

12. The detection device of claim 8, wherein the capture module receives the plurality of electric information transmitted by the plurality of HDMI ports when the connection statuses of the plurality of HDMI ports are changed.

13. The detection device of claim 8, wherein the multimedia device is a sink device and the sink device is a display device.

14. The detection device of claim 8 further comprising an indication generation unit, for generating an indication message according to the connection conditions of the plurality of HDMI ports.

15. The detection device of claim 14 further comprising an output unit and a storage unit, for outputting and storing the indication message respectively.

16. The detection device of claim 8, wherein the capture module further receives a plurality of electric information of a plurality of ports of a repeater device through an HDMI port of the plurality of HDMI ports, and the logic module further determines connection conditions of the plurality of ports according to the plurality of electric information of the plurality of ports.

17. A multimedia device, for High-Definition Multimedia Interface compatible (HDMI-compatible) multimedia system, comprising:
   a plurality of HDMI ports;
   a switch controller, coupled to the plurality of HDMI ports, for switching to output signals of an HDMI port of the plurality of HDMI ports, and comprises a buffer, for storing a plurality of electric information of the plurality of HDMI ports;
   an operating module, for processing signals outputted from the switch controller; and
   a detection device, comprising:
      a capture module, for reading the buffer of the switch controller, to receive the plurality of electric information of the plurality of HDMI ports; and
      a logic module, for determining connection conditions of the plurality of HDMI ports according to the plurality of electric information, wherein each of the connection conditions of the plurality of HDMI ports indicates whether an external HDMI device is attached to a corresponding HDMI port of the plurality of HDMI ports;

wherein the detection device transmits detection results of the connection conditions of the plurality of HDMI ports to an operating module, and the operating module further derives the connection conditions of the plurality of HDMI ports by sending poll packets through a Consumer Electronics Control (CEC) channel and comprises a processor, a power management device, a periphery state detection circuit, a storage device, an output device, for realizing functions of the HDMI-compatible multimedia device.

18. The multimedia device of claim 17, wherein the capture module comprises:

a plurality of electric signal generation units, coupled to the plurality of HDMI ports, for generating a plurality of analog electric signals of the plurality of HDMI ports; and a detection unit, for detecting the plurality of analog electric signals, to periodically receive the plurality of electric information according to a default period.

19. The multimedia device of claim 18, wherein an electric signal generation unit of the plurality of electric signal generation units is a resistor.

20. The multimedia device of claim 18 further comprising an analog-to-digital conversion unit, for converting the plurality of analog electric signals into a plurality of digital signals.

21. The multimedia device of claim 17, wherein the capture module receives the plurality of electric information transmitted by the plurality of HDMI ports when the connection statuses of the plurality of HDMI ports are changed.

22. The multimedia device of claim 17, wherein the multimedia device is a sink device and the sink device is a display device.

23. The multimedia device of claim 17, wherein the operating module further comprises an indication generation unit, for generating an indication message according to the connection conditions of the plurality of HDMI ports.

24. The multimedia device of claim 23, wherein the operating module further comprises an output unit and a storage unit, for outputting and storing the indication message respectively.

25. The multimedia device of claim 17, wherein the capture module further receives a plurality of electric information of a plurality of ports of a repeater device through an HDMI port of the plurality of HDMI ports, and the logic module further determines connection conditions of the plurality of ports according to the plurality of electric information of the plurality of ports.

\* \* \* \* \*